US011612457B2

(12) United States Patent
Ruiz-Vela

(10) Patent No.: US 11,612,457 B2
(45) Date of Patent: Mar. 28, 2023

(54) ADJUSTABLE HOOK FOR ORTHODONTIC BRACKETS

(71) Applicant: World Class Technology Corporation, McMinnville, OR (US)

(72) Inventor: Alberto Ruiz-Vela, Alta Loma, CA (US)

(73) Assignee: World Class Technology Corporation, McMinnville, OR (US)

( * ) Notice: Subject to any disclaimer, the term of this patent is extended or adjusted under 35 U.S.C. 154(b) by 0 days.

(21) Appl. No.: 15/927,445

(22) Filed: Mar. 21, 2018

(65) Prior Publication Data

US 2018/0271621 A1    Sep. 27, 2018

Related U.S. Application Data

(63) Continuation-in-part of application No. 15/729,525, filed on Oct. 10, 2017, now abandoned.
(Continued)

(51) Int. Cl.
*A61C 7/14* (2006.01)
*A61C 7/10* (2006.01)
(Continued)

(52) U.S. Cl.
CPC ............... *A61C 7/141* (2013.01); *A61C 7/10* (2013.01); *A61C 7/14* (2013.01); *A61C 7/146* (2013.01);
(Continued)

(58) Field of Classification Search
CPC ............ A61C 7/141; A61C 7/10; A61C 7/12; A61C 7/14; A61C 7/146; A61C 7/08; A61C 7/22; A61C 7/287
See application file for complete search history.

(56) References Cited

U.S. PATENT DOCUMENTS

| 4,614,497 A | 9/1986 | Kurz |
| 4,639,219 A | 1/1987 | Gagin |

(Continued)

FOREIGN PATENT DOCUMENTS

| EP | 1723927 A1 | 11/2006 |
| EP | 2705807 A1 | 3/2014 |

(Continued)

OTHER PUBLICATIONS

International Searching Authority, International Search Report and Written Opinion from PCT Application No. PCT/US2018/023400, dated Jun. 1, 2018, 8 pages.

(Continued)

*Primary Examiner* — Heidi M Eide
(74) *Attorney, Agent, or Firm* — Stoel Rives LLP

(57) ABSTRACT

An orthodontic bracket with an adjustable hook designed to facilitate bending. The orthodontic bracket includes a bracket body mountable to a tooth and an adjustable hook extending from the bracket body, the adjustable hook comprising a stem base structure a bend region extending from the stem base structure, a neck region extending from the bend region, and a head extending from the neck region. In some embodiments, the adjustable hook has a length, $L_1$, measured from a bottom portion of the stem base structure to the head, and a length, $L_2$, measured from a bottom portion of the neck region of the hook stem to a free end of the head, wherein $L_2$ is greater than or equal to 60% of $L_1$.

10 Claims, 4 Drawing Sheets

Related U.S. Application Data

(60) Provisional application No. 62/475,088, filed on Mar. 22, 2017.

(51) Int. Cl.
    *A61C 7/08*     (2006.01)
    *A61C 7/22*     (2006.01)
    *A61C 7/28*     (2006.01)

(52) U.S. Cl.
    CPC .................. *A61C 7/08* (2013.01); *A61C 7/22* (2013.01); *A61C 7/287* (2013.01)

(56) References Cited

U.S. PATENT DOCUMENTS

| | | | |
|---|---|---|---|
| 4,712,999 A | 12/1987 | Rosenberg | |
| 5,125,831 A | 6/1992 | Pospisil | |
| 5,306,142 A | 4/1994 | Richards | |
| 5,395,237 A * | 3/1995 | Pospisil | A61C 7/14 29/896.11 |
| 6,042,374 A | 3/2000 | Farzin-Nia et al. | |
| 6,071,118 A * | 6/2000 | Damon | A61C 7/287 433/9 |
| 6,095,808 A | 8/2000 | Nakagawa | |
| 6,478,579 B1 * | 11/2002 | Brusse | A61C 7/12 433/10 |
| 6,655,962 B1 * | 12/2003 | Kennard | A61C 8/0022 433/174 |
| 7,878,802 B2 | 2/2011 | Hagelganz et al. | |
| 9,004,916 B2 | 4/2015 | Ruiz-Vela et al. | |
| 9,089,386 B2 | 7/2015 | Hagelganz et al. | |
| 9,492,247 B2 | 11/2016 | Ruiz-Vela et al. | |
| 2004/0259047 A1 | 12/2004 | Le Gouefflec et al. | |
| 2004/0259048 A1 | 12/2004 | Balabanovsky | |
| 2006/0216673 A1 * | 9/2006 | Park | A61C 8/0022 433/173 |
| 2006/0263737 A1 * | 11/2006 | Oda | A61C 7/12 433/10 |
| 2009/0004619 A1 | 1/2009 | Oda et al. | |
| 2009/0061376 A1 * | 3/2009 | Wool | A61C 7/287 433/11 |
| 2010/0105000 A1 | 4/2010 | Scommegna et al. | |
| 2012/0064475 A1 * | 3/2012 | Lewis | A61C 7/141 433/10 |
| 2015/0223914 A1 * | 8/2015 | Sabilla | A61C 7/287 433/11 |
| 2017/0007370 A1 * | 1/2017 | Ni | A61C 7/287 |
| 2018/0193110 A1 * | 7/2018 | Crouse | A61C 7/12 |

FOREIGN PATENT DOCUMENTS

| | | |
|---|---|---|
| JP | H11338 A | 1/1999 |
| JP | 2005511240 A | 4/2005 |
| WO | 2003051223 A1 | 6/2003 |
| WO | WO-2010117927 A1 * | 10/2010 ............. A61C 7/303 |

OTHER PUBLICATIONS

European Patent Office, Extended European Search Report for Application 18770734.4, dated Oct. 20, 2020, 7 pages.

European Patent Office, Extended European Search Report for Application 18771177.5, dated Oct. 20, 2020, 7 pages.

* cited by examiner

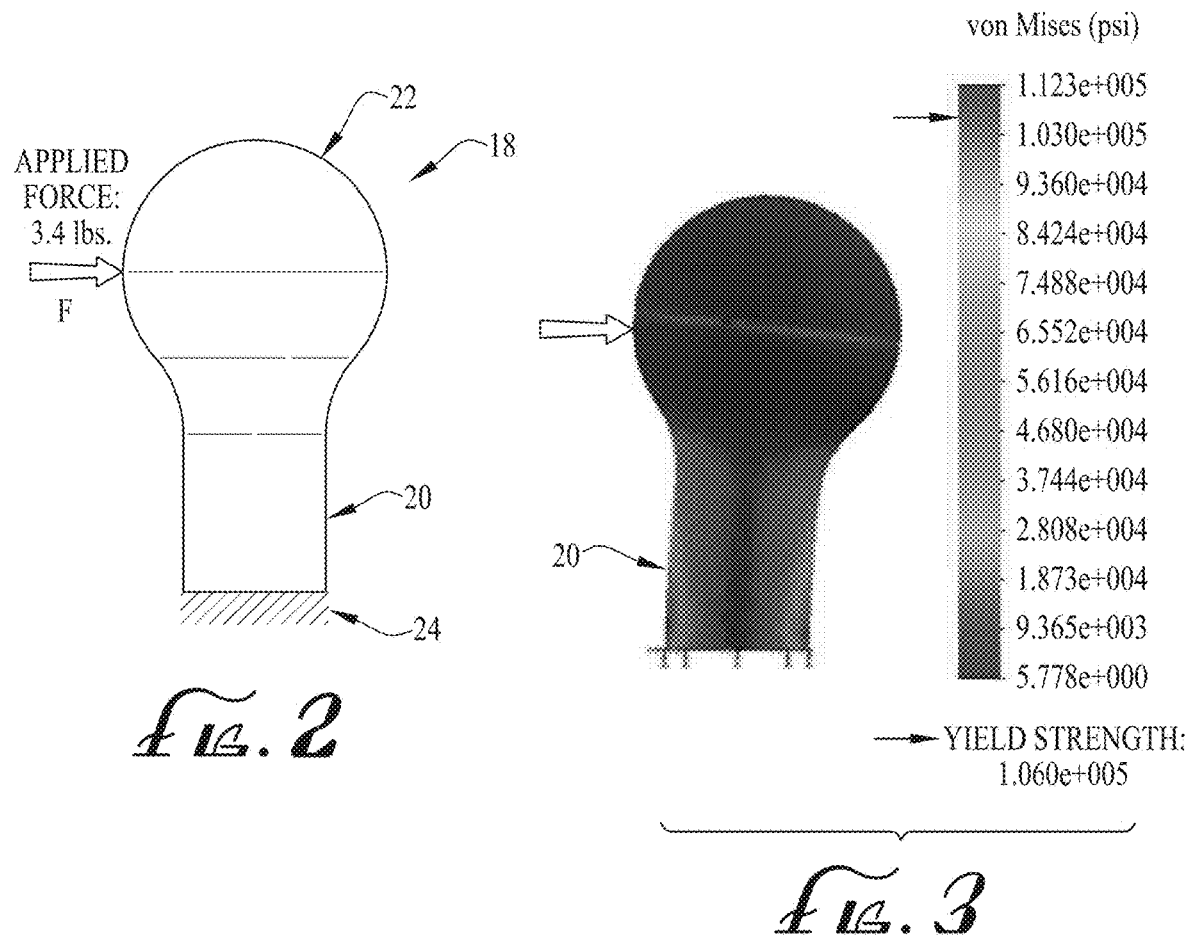
*fig.2*
*fig.3*
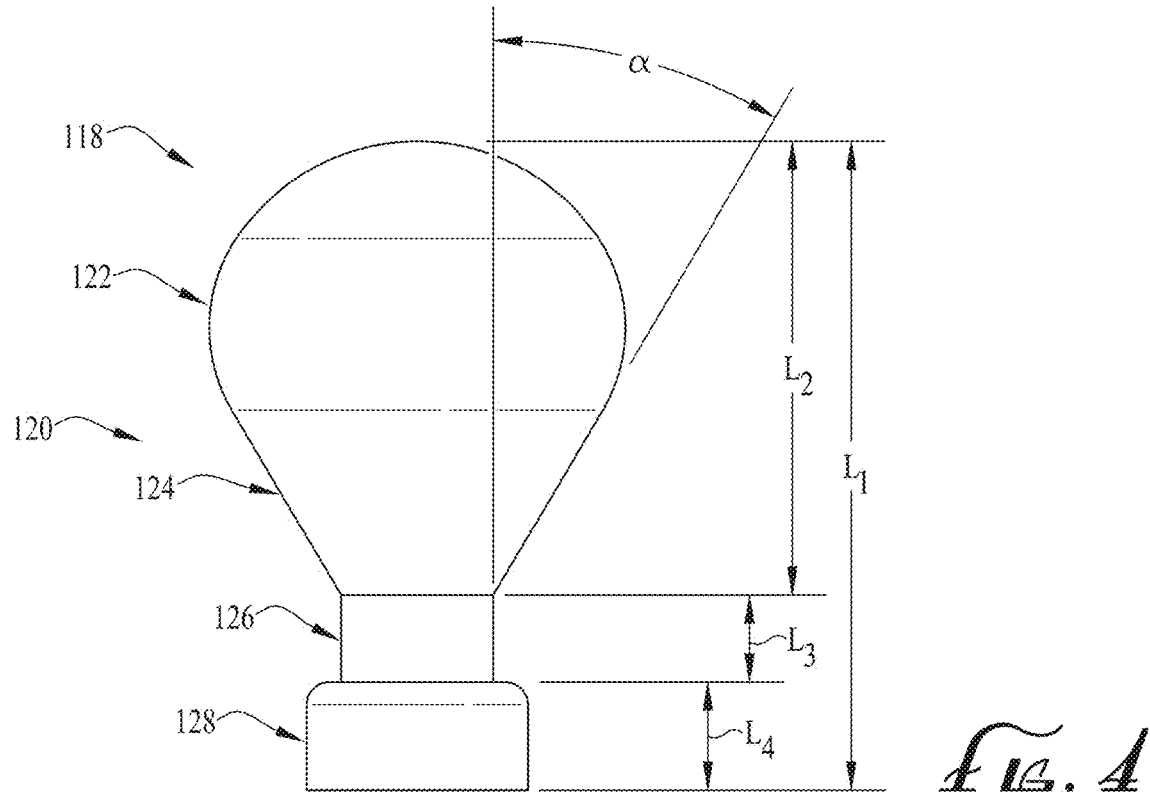
*fig.4*

ADJUSTABLE HOOK FOR ORTHODONTIC BRACKETS

RELATED APPLICATION DATA

This application is a continuation-in-part of and claims the benefit under 35 U.S.C. § 120 from U.S. patent application Ser. No. 15/729,525, filed Oct. 10, 2017, which is a nonprovisional of and claims the benefit under 35 U.S.C. § 119(e) of U.S. Provisional Patent Application No. 62/475,088, filed Mar. 22, 2017, the disclosures of which are each incorporated by reference herein in its entireties.

TECHNICAL FIELD

The field of the present disclosure relates generally to orthodontic brackets and, in particular, to such brackets having an adjustable hook designed to facilitate bending for improving patient comfort, while retaining sufficient stability to prevent unwanted bending in response to orthodontic loads.

BACKGROUND

Dental braces are orthodontic devices commonly used to align and straighten a patient's teeth and to correct various other flaws relating to the teeth and jaw. Typically, braces include a set of orthodontic brackets, each bracket being adhered to an individual tooth with a bonding material or other adhesive. Once the brackets are in position on the teeth, an archwire is inserted through a slot formed on each of the brackets. In this configuration, tightening of the archwire applies pressure on the brackets, which in turn urge movement of the teeth into a desired position and orientation. In conventional braces, an elastic ligature or O-ring may be used to retain the archwire in position and ensure that the archwire does not disengage from the bracket slot. In more recent designs, self-ligating braces use a sliding or hinged door mechanism, instead of an elastic ligature, to secure the archwire within the bracket slot.

In both conventional braces and self-ligating braces, certain of the orthodontic brackets, such as those positioned on the canine, premolars, or molars, may include a hook extending outwardly from the bracket body. The hook provides an attachment point for auxiliary devices (such as elastics, coil springs, or power chains) that may be used to occlude crooked teeth together, correct an overbite, and/or correct other issues. When the orthodontic bracket is arranged on a tooth, the hook extends from the bracket body toward the gingiva. For some patients, the hook may cause discomfort or irritation on the cheeks or lips. To alleviate these issues, a dentist or other practitioner may adjust or bend the hook to a more comfortable configuration that best suits the patient's needs.

Currently, orthodontic brackets and hooks are typically made using high-strength materials, such as 17-4 stainless steel. The higher strength materials allow for smaller and thinner bracket designs because the stronger materials provide sufficient strength to withstand orthodontic loads and prolonged use. However, one disadvantage of using high-strength materials is that a large application of force is required to adjust or bend the hook when needed. On some occasions, this large application of force may cause damage to the bracket body and/or hook, may dislodge the bracket from the tooth, and/or may cause other injuries to the patient.

Accordingly, the present inventor has identified a need for an orthodontic bracket with an improved design to accommodate the use of high-strength materials, while providing sufficient flexibility to minimize the loads required to adjust the hook, and while retaining sufficient stability to prevent unwanted bending in response to orthodontic loads. Additional aspects and advantages will be apparent from the following detailed description of preferred embodiments, which proceeds with reference to the accompanying drawings.

BRIEF DESCRIPTION OF THE DRAWINGS

FIG. 2 is an enlarged view of an adjustable hook of the orthodontic bracket of FIG. 1, the hook illustrated in a straightened configuration.

FIG. 3 illustrates a stress analysis of the adjustable hook of FIG. 2 in response to a force applied along a midpoint of the head.

FIG. 4 is an enlarged view of another embodiment of an adjustable hook for an orthodontic bracket.

DETAILED DESCRIPTION OF EXAMPLE EMBODIMENTS

With reference to the drawings, this section describes particular embodiments of various orthodontic brackets and their detailed construction and operation. Throughout the specification, reference to "one embodiment," "an embodiment," or "some embodiments" means that a particular described feature, structure, or characteristic may be included in at least one embodiment of an orthodontic bracket. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

In the following description, particular components of the orthodontic brackets may be described in detail. It should be understood that in some instances, well-known structures, materials, or operations are not shown and/or not described in detail to avoid obscuring more pertinent aspects of the embodiments. In addition, although the embodiments may illustrate and reference particular orthodontic bracket designs, other embodiments may include additional or fewer components than the described embodiments.

With general reference to FIGS. 1-7, the following disclosure relates to an orthodontic bracket 10 having an adjustable hook 118, 218 (see FIGS. 4 and 7, respectively) designed with an improved geometry to facilitate adjustment or bending of the hook 118, 218 without sacrificing structural stability and strength of the orthodontic bracket 10.

Additional details relating specifically to the adjustable hook 118 of the orthodontic bracket 10 are further described in detail below.

Figure 1:
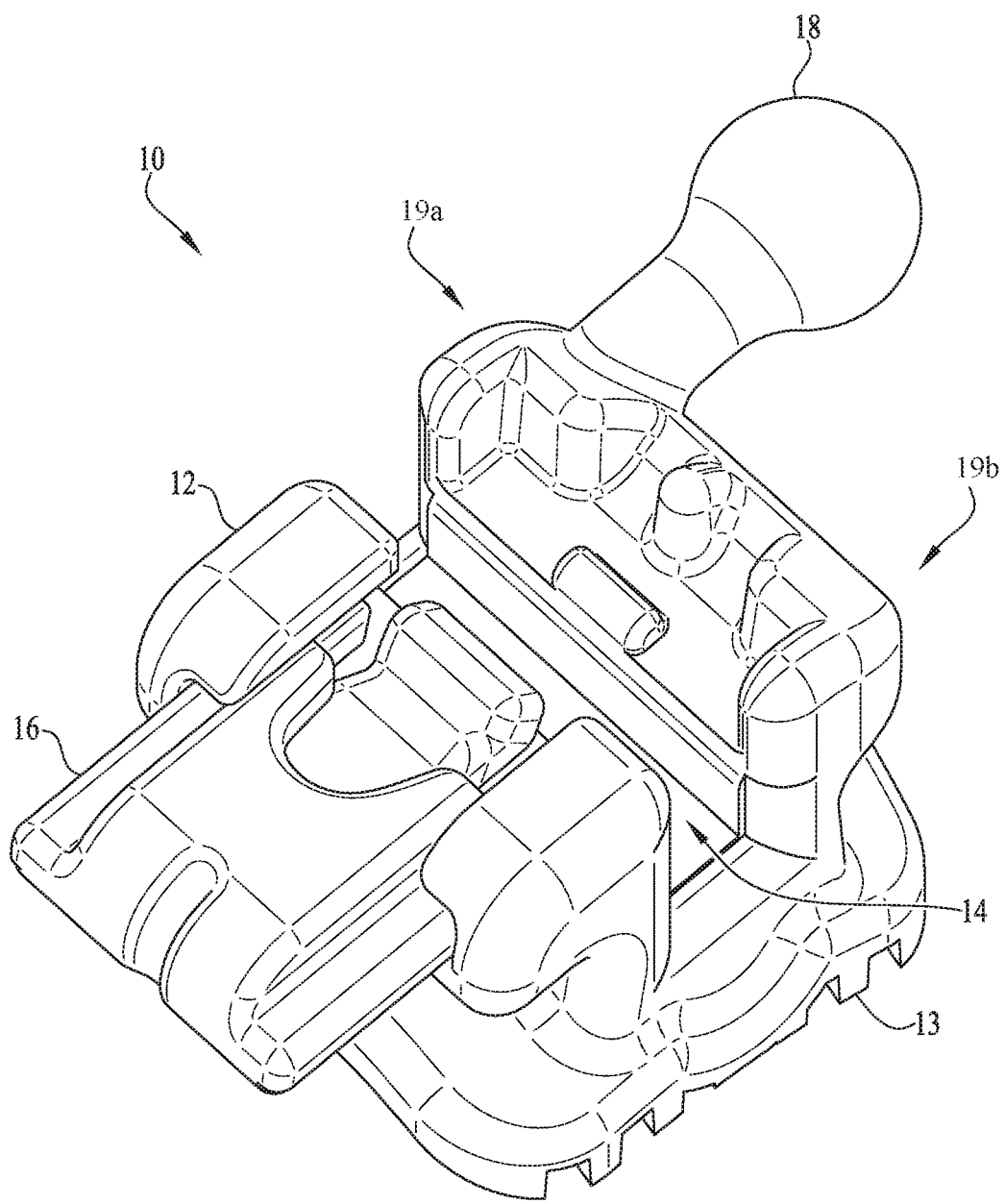
FIG. 1 is a view of an orthodontic bracket in accordance with one embodiment.

FIGS. 1-3 illustrate one embodiment of a conventional orthodontic bracket 10 with an adjustable hook 18. With particular reference to FIG. 1, the conventional orthodontic bracket 10 may include a bracket body 12 mountable to a patient's tooth. In some embodiments, the bracket body 12 may include a series of grooves or ridges 13 formed along a mounting base surface of the bracket body 12. To mount the orthodontic bracket 10 on a patient's tooth, an adhesive or other bonding material may be applied along the mounting base surface and the ridges 13 of the bracket body 12 to provide a solid connection with the tooth and prevent dislodging. The bracket body 12 further includes an archwire slot 14 formed thereon and extending transversely across the bracket body 12 (i.e., in the mesial-distal direction when the orthodontic bracket 10 is mounted to a tooth) from one side edge of the bracket body to an opposite side edge. The slot 14 is sized and dimensioned to receive an archwire (not shown) therein. The orthodontic bracket 10 further includes a suitable ligating structure 16, such as a slidable door or closure, coupled to the bracket body 12. The ligating structure 16 is slidable or movable in the incisal-gingival direction (i.e., a direction extending along the biting surface of the tooth and the gingiva) to an open position for allowing the archwire to enter the slot 14 of the bracket body 12, and to a closed position for securing or retaining the archwire within the slot 14. As mentioned previously, when the ligating structure 16 is in the closed position, the archwire is urged downwardly into the slot 14 and applies pressure to the bracket body 12 and the patient's teeth to effect the desired tooth movement. Additional details and configurations of an example embodiment for an orthodontic bracket are described in U.S. Pat. No. 9,004,916, the disclosure of which is incorporated herein by reference.

It should be understood that the self-ligating orthodontic bracket 10 illustrated in FIG. 1 is merely one example embodiment and is not intended to be limiting within the context of this disclosure. For purposes of this disclosure, one having skill in the art will understand that any other design and configuration of a self-ligating orthodontic bracket may be used. In addition, in other embodiments, the orthodontic bracket may not be a self-ligating bracket, but may instead be a conventional bracket that includes elastic ligatures (e.g., O-rings) instead of a sliding closure.

In some conventional designs, the orthodontic bracket 10 further includes one or more tie wings 19a, 19b, where, the hook 18 extends from one of the tie wings 19a of the bracket body 12 toward the gingiva when the orthodontic bracket 10 is mounted to a tooth. Typically, the hook 18 is formed as an integral component of the bracket body 12, but in other embodiments the hook 18 may be formed separately and thereafter affixed to the bracket body 12. In many conventional designs, the hook 18 has a cross-section on a hook stem 20 that is mostly or entirely uniform, as illustrated in FIGS. 2-3. With reference to FIGS. 2-3, the uniform cross-section of the hook stem 20 results in a uniform yield strength along the length of the hook stem 20. Because of this uniform cross-section, the hook stem 20 does not provide a specific area where the hook 18 is intended to bend when a load is applied to the hook 18 to adjust its position. In addition, as further described in detail below with respect to FIG. 3, the larger uniform cross-section of the hook stem 20 requires a large application of force to effect any adjustment of the hook 18.

In other embodiments, the hook 18 may have any one of a variety of non-uniform cross-sections. In such embodiments, the non-uniform cross-section is intended to improve the retention of an auxiliary device, such as an elastic ligature, that may be attached to the hook 18. However, the non-uniform cross-section is typically not effective in providing a designated location where the hook 18 is intended to bend or for minimizing the force required to bend the hook 18 because the hook shape is maximized for retention as noted previously.

With particular reference to FIGS. 2 and 3, the following section describes an example stress analysis for the conventional design of the hook 18, where the hook 18 is designed with the geometry illustrated in FIG. 2, and where the hook stem 20 has a generally uniform cross-section and a head 22 is generally round and has a constant curvature or arc. As illustrated in FIG. 2, a stem base 24 is fixed to the bracket body 12 (e.g., the stem base 24 is an integral portion of the bracket body 12). The analysis described below is based on the geometry shown below for the hook 18 made of sintered 17-4 stainless steel. As noted in FIGS. 2 and 3, a stress analysis of the hook design demonstrates that the force F required for the hook stem 20 to start bending is approximately 3.4 lbs., with the force F being applied at a midpoint of the head 22.

With collective reference to FIGS. 4-7, the following sections describe embodiments incorporating an improved geometry for the orthodontic bracket, particularly an improved design of the adjustable hook, that promotes bending of the hook with a reduced application of force, and that directs all attached auxiliary devices toward the bend region of the hook to ensure that the hook does not bend or otherwise deform under orthodontic loads. It should be understood that although FIGS. 4-7 focus on the design of the adjustable hook and do not illustrate a particular bracket body with which the hook may be used, the hook may be incorporated into any suitable bracket body without departing from the principles of the disclosed subject matter.

FIG. 4 is an enlarged view of one embodiment of the hook 118 for an orthodontic bracket (such as the orthodontic bracket 10 illustrated in FIG. 1). As illustrated in FIG. 4, the hook 118 includes a hook stem 120 comprising a neck region 124 and a bend region 126. The hook 118 further includes a head 122 extending from the neck region 124 of the hook stem 120, the head 122 having a generally rounded or arcuate shape. As illustrated in FIG. 4, the neck region 124 extends radially outwardly from the bend region 126 toward the head 122 and defines a transition angle, $\alpha$. Additional details relating to the transition angle, $\alpha$, are further described below. In one embodiment, the hook 118 is formed as an integral component of the bracket body, where the orthodontic bracket is manufactured via a metal injection molding process of sintered 17-4 stainless steel. In such embodiments, a stem base structure 128 of the hook 118 extends outwardly and away from the bracket body (such as the bracket body 12 of FIG. 1) of the orthodontic bracket. As is further described in detail below, the hook 118 may be molded such that the stem base structure 128 is wider and has a larger cross-sectional area as compared to the bend region 126. This design helps concentrate stresses at the bend region 126 of the hook stem 120, and avoids stress concentration at the junction point between the stem base structure 128 of the hook 118 and the bracket body, thereby avoiding potential failure at the junction point. In addition, the smaller cross-sectional area of the bend region 126 helps minimize loads required to bend the hook 118 to facilitate adjustment of the hook 118 as desired. Additional details of the design geometry and features of the hook 118 are described below.

It should be understood that in other embodiments, the orthodontic bracket may instead be cast or machined, or may use other ductile materials, such as nickel-free stainless steel, 300 series stainless steel alloys, and titanium alloys (e.g., Ti 6-4, commercial pure (CP) titanium, and nickel titanium). Such embodiments preferably incorporate the same characteristics described previously with respect to the hook stem 120 and head 122.

With particular reference to FIG. 4, the following describes an example geometric design of the hook 118, and describes certain advantages introduced by the improved design. With reference to FIG. 4, the hook 118 has an overall length, $L_1$, extending from the bottom portion of the stem base structure 128 (e.g., where the hook 118 extends from the bracket body 12) to the free end of the head 122. In one example embodiment, the stem base structure 128 has a length, $L_4$, with the bend region 126 of the hook stem 120 having a length of $L_3$, as measured from a distal portion of the stem base structure 128 to the bottom portion of the neck region 124. The neck region 124 and head 122 have a combined length, $L_2$, extending from the distal portion of the bend region 126 to the free end of the head 122. In some embodiments, the neck region 124 may comprise approximately 25-40% of the length, $L_2$, and the head 122 may comprise the remainder of the length, $L_2$. In some embodiments, the neck region 124 may be generally planar and gradually widen from the bend region 126 toward the head 122, at a transition angle, $\alpha$, to define a generally tear-drop shape geometry for the neck region 124 and the head 122 as illustrated in FIG. 4. As illustrated, the tear-drop shape may comprise an angled surface extending from the bend region 126 of the hook stem 120, the angled surface transitioning into a curved surface extending to the free end of the head 122. As was mentioned previously, this tear-shaped geometry urges any attached auxiliary device to slide downwardly from the head 122 and along the angled neck region 124 toward the bend region 126 to ensure orthodontic loads are concentrated at the bend region 126.

With particular reference to FIG. 4, the following section provides example ratio ranges for the various sections of the hook 118. With general reference to FIG. 4, the length, $L_2$, for the combined neck region 124 and the head 122 is preferably greater than or equal to approximately 60% of the overall length, $L_1$, of the hook 118. In addition, the length, $L_3$, of the bend region 126 of the hook stem 120 is preferably equal to or less than approximately 25% of the overall length, $L_1$, with the bend region 126 of the hook stem 120 having a cross-sectional area ranging from approximately $1.1e^{-4}$ in$^2$ to $2.6e^{-4}$ in$^2$. As noted above, the cross-sectional area of the bend region 126 is preferably smaller than the cross-sectional area of the stem base structure 128 to concentrate orthodontic loads away from the junction point between the hook 118 and the bracket body. However, in other embodiments, the stem base structure 128 and the bend region 126 may have the same cross-sectional area, essentially defining a more elongated bend region 126 than the design illustrated in FIG. 4. In still other embodiments, the cross-sectional area of the bend region 126 may be uniform, while in other embodiments the cross-sectional area may instead be variable. Further, the transition angle, $\alpha$, of the neck region 124 measured from the distal end of the bend region 126 may be equal to or greater than 10 degrees.

For example, in one embodiment, the hook 118 may be designed with the following proportions:
$L_2$=70% of $L_1$
$L_3$=16.6% of $L_1$
Angle A=29.6 degrees
Cross-sectional area of hook stem=$1.77e^{-4}$ in$^2$ It should be understood that the foregoing dimensions and ratios are meant to provide an example embodiment of the hook geometry and is not intended as limiting. In other embodiments, the length, $L_2$, of the neck region 124 and the head 122 may range from 60% to 75% of the overall length, $L_1$, of the hook 118, and the length, $L_3$, of the bend region 126 of the hook stem 120 may range from 15% to 25% of the overall length, $L_1$, with the bend region 126 having a cross-sectional area ranging from approximately $1.0e^{-4}$ in$^2$ to $3.0e^{-4}$ in$^2$. Moreover, the transition angle, $\alpha$, may range from 10 degrees to 45 degrees.

Figure 5:
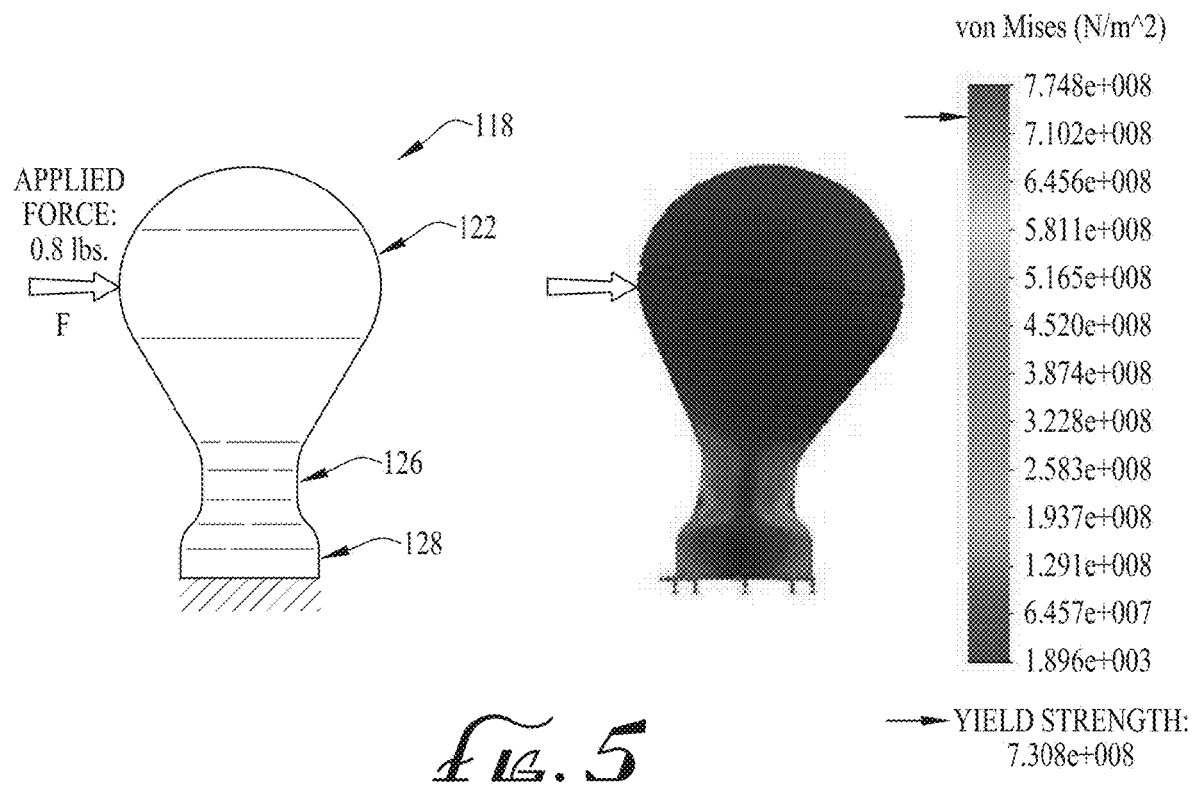
FIG. 5 illustrates a stress analysis of an adjustable hook having a similar geometric design to that of FIG. 4 in response to a force applied along a midpoint of the head.
Figure 6:
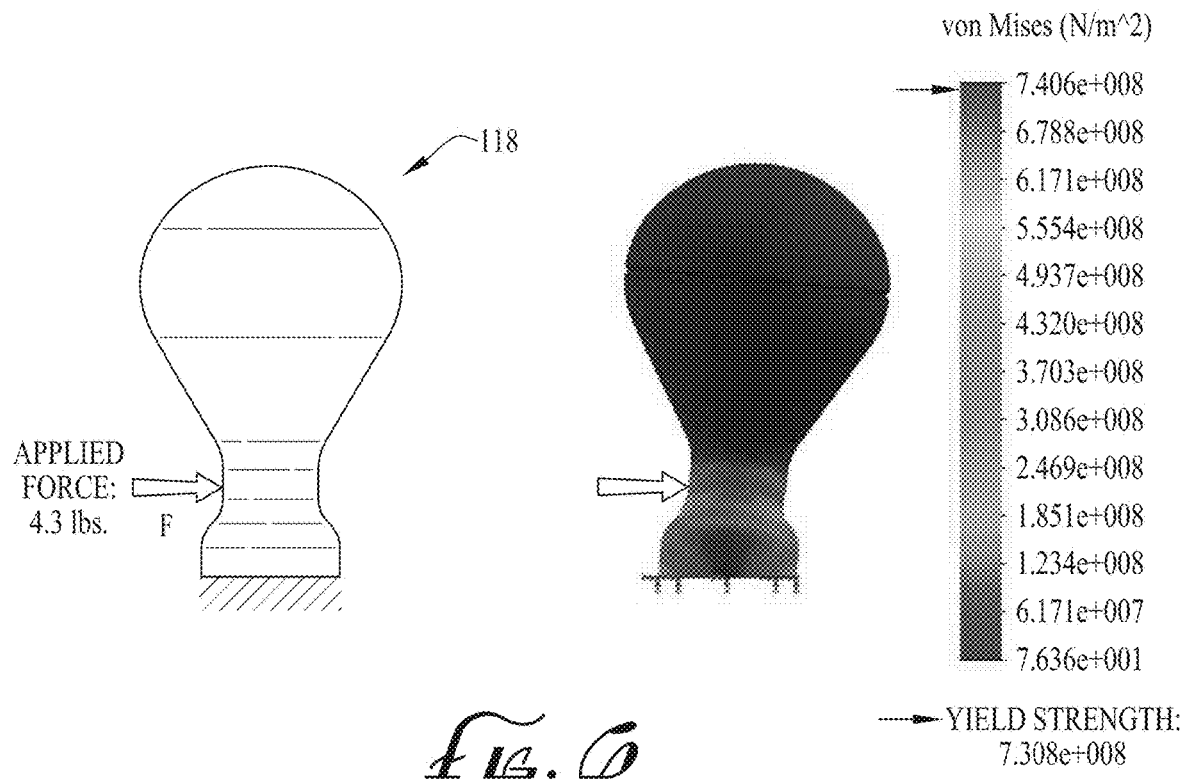
FIG. 6 illustrates a stress analysis of the adjustable hook of FIG. 5 in response to a force applied along the stem of the hook.

With general reference to FIGS. 5 and 6, the following sections describe bending performance of an adjustable hook 118 having a similar geometric design as the hook described with reference to FIG. 4. It should be noted that the adjustable hook in FIGS. 5 and 6 is similar to the adjustable hook of FIG. 4, but with minor modifications to the curvatures of the bend region 126 and the stem base structure 128 as illustrated. With the improved design characteristics, a stress analysis demonstrates that the force F required for the bend region 126 of the hook stem 120 to start bending is approximately 0.8 lbs., which is less than 25% of the force required to bend the example conventional hook 18 of FIG. 1. In addition, with the reduced cross-sectional area of the bend region 126 of the hook stem 120, the force applied at the head 122 localizes the bending of the hook 118 at the bend region 126 of the hook stem 120 (see FIG. 5).

Moreover, as mentioned previously, when an auxiliary device, such as an elastic, a coil spring, a power chain, or other suitable device, is attached to the hook 118, the curvature of the head 122 and the transition angle, $\alpha$, of the neck region 124 urges the auxiliary device to slide downwardly and rest against the bend region 126 of the hook stem 120. As illustrated in FIGS. 5 and 6, the bend region 126 has a sufficiently large cross-sectional area to stabilize the hook 118 such that orthodontic loads that are applied to the bend region 126 (e.g., loads applied by the auxiliary device) will not cause the hook 118 to deform. As noted in FIG. 6, the bend region 126 of the hook stem 120 is capable of resisting an applied force F of up to 4.3 lbs. of force before starting to bend.

Accordingly, the geometric design of the hook 118 as illustrated in FIGS. 4-6 provides for an optimal cross-sectional area of the bend region 126 such that the force required to bend the hook 118 is minimized when applied to the head 122. In addition, the design of the head 122 and the neck region 124 drive orthodontic loads downwardly toward the bend region 126, which, despite having a small cross-sectional area, retains sufficient strength and stability to handle typical orthodontic loads applied at the bend region 126 without bending.

Figure 7:
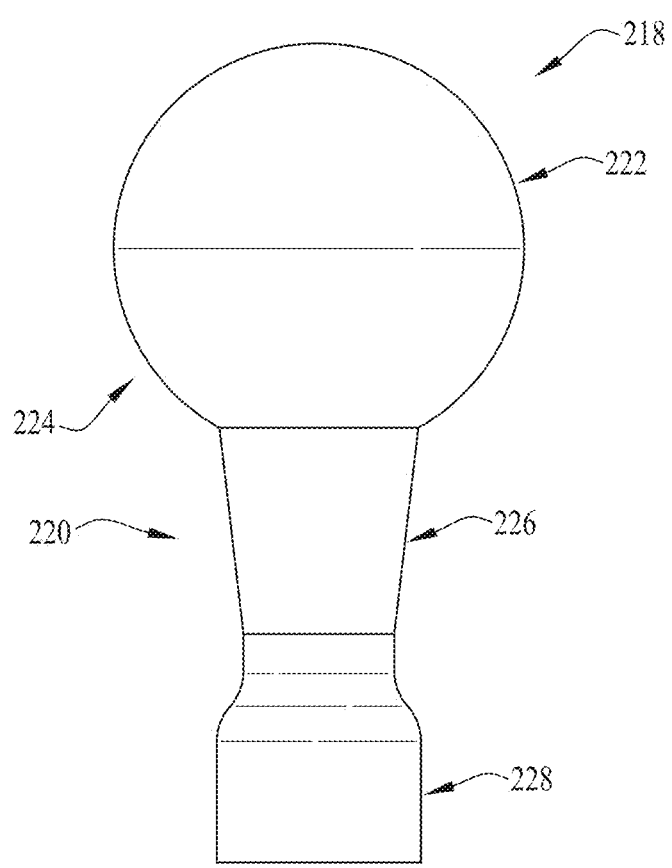
FIG. 7 illustrates another embodiment of an adjustable hook for an orthodontic bracket.

FIG. 7 illustrates another embodiment of an adjustable hook 218 for an orthodontic bracket. As illustrated in FIG. 7, the hook 218 includes a hook stem 220, with a bend region 226 and a neck region 224 supporting a head 222. The hook 218 also includes a base structure 228 extending from the bracket body (such as bracket body 12) of the orthodontic bracket. In one embodiment, the hook 218 is formed as an integral component of the bracket body, where the orthodontic bracket is made via a metal injection molding process of sintered 17-4 stainless steel. In other embodiments, the orthodontic bracket may instead be cast or machined.

With reference to FIG. 7, the head 222 is formed as a round surface having a constant curvature and supported by the neck region 224 and the bend region 226 having a generally tapered configuration. In one embodiment, the curvature of the neck region 224 may be the same or substantially the same as the curvature of the head 222, thereby creating a hook 118 with a generally constant curvature for the head 222 and neck region 224. In addition, the bend region 226 of the hook stem 220 may have a greater width adjacent the neck region 224 and gradually narrows from the neck region 224 toward the base structure 228. In a similar fashion as described with reference to FIGS. 5 and 6, the design of the hook 218 provides a region of the hook stem 220 that promotes bending, with the bend region 226 being offset from the base structure 228 where the hook 218 connects to the bracket body to reduce the likelihood of stem fracture at this junction when the hook 218 is bent.

It should be understood that while the figures illustrate two example geometric designs for an improved adjustable hook 118, 218, other configurations may be possible without departing from the principles of the disclosed subject matter. In addition, although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that many changes may be made to the details of the above-described embodiments without departing from the underlying principles of the invention.

The invention claimed is:

1. An orthodontic bracket comprising:
a bracket body mountable to a tooth, the bracket body including a first side edge and an opposite second side edge, wherein the bracket body further includes a slot formed therein and extending across the bracket body from the first side edge to the second side edge, the slot dimensioned to receive an archwire, the bracket body further including a tie wing;
a ligating structure coupled to the bracket body, the ligating structure being movable to an open position to accommodate placement of the archwire into the slot, and to a closed position whereat a portion of the ligating structure is positioned over the slot to secure the archwire therein; and
an adjustable hook formed as an integral component of the bracket body, the adjustable hook comprising:
a stem base structure extending from one of the bracket body or the tie wing of the bracket body;
a hook stem comprising a bend region and a neck region, wherein the bend region extends from the stem base structure and defines a region of the adjustable hook at which the adjustable hook bends in response to an applied load, the bend region having a length, $L_3$, and wherein the neck region extends from the bend region; and
a head extending from a distal end of the neck region, the head including a curved side surface and a free end,
wherein the adjustable hook has a length, $L_1$, measured from a bottom portion of the stem base structure to the free end of the head, and a length, $L_2$, measured from a bottom portion of the neck region to the free end of the head, and wherein a length of the neck region ranges between 25% to 40% of $L_2$ and comprises an angled side surface throughout between the bend region and the head, the angled side surface flaring outwardly as it extends from the bend region to the head at an angle ranging between 10 degrees and 45 degrees, wherein $L_3$ is equal to or less than 25% of $L_1$, and $L_2$ is greater than or equal to 60% of $L_1$, and wherein the bend region has a length shorter than a corresponding length of the neck region.

2. The orthodontic bracket of claim 1, wherein the cross-sectional area is uniform throughout the bend region, the cross-sectional area ranging between $1.0e^{-4}$ in$^2$ and $3.0e^{-4}$ in$^2$.

3. The orthodontic bracket of claim 2, wherein the cross-sectional area of the bend region ranges between $1.1e^{-4}$ in$^2$ and $2.6e^{-4}$ in$^2$.

4. The orthodontic bracket of claim 1, wherein the adjustable hook and bracket body are manufactured using a metal injection molding process.

5. The orthodontic bracket of claim 1, wherein the bracket body comprises 17-4 stainless steel.

6. The orthodontic bracket of claim 1, wherein the cross-sectional area of the bend region is uniform throughout.

7. The orthodontic bracket of claim 1, wherein the head has a shape corresponding to a spherical cap extending from the neck region, the head having its largest cross-sectional area at a point spaced apart from the distal end of the neck region.

8. The orthodontic bracket of claim 1, wherein the angled side surface of the neck region is formed at a constant angle.

9. The orthodontic bracket of claim 1, wherein the stem base structure has a width greater than that of the bend region, and wherein the stem base structure and bend region together form a shoulder.

10. The orthodontic bracket of claim 1, wherein the head has its largest cross-sectional area at a point spaced apart from the distal end of the neck region.

* * * * *